United States Patent [19]

Katayama et al.

[11] Patent Number: 5,588,069

[45] Date of Patent: Dec. 24, 1996

[54] IMAGE PROCESSING APPARATUS FOR ADVANTAGEOUSLY ENCODING BLOCKS OF DATA HAVING EITHER SUBSTANTIALLY THE SAME OR VARIED COLORS

[75] Inventors: Akihiro Katayama, Kawasaki; Yasuhiko Yasuda, Musashino, both of Japan

[73] Assignee: Canon Kabushiki Kaisha, Tokyo, Japan

[21] Appl. No.: 397,716

[22] Filed: Mar. 2, 1995

Related U.S. Application Data

[63] Continuation of Ser. No. 808,646, Dec. 17, 1991, abandoned.

[30] Foreign Application Priority Data

Dec. 19, 1990  [JP]  Japan ..................... 2-403548

[51] Int. Cl.$^6$ ..................................... G06K 9/36
[52] U.S. Cl. ................. 382/166; 382/239; 358/539
[58] Field of Search ..................... 358/432, 433, 358/453, 462, 430, 538, 539; 382/173, 176, 232, 239, 243, 250, 162, 166; H04N 1/41

[56] References Cited

U.S. PATENT DOCUMENTS

| | | | |
|---|---|---|---|
| 4,266,249 | 5/1981 | Chai et al. | 358/260 |
| 4,366,505 | 12/1982 | Tsuda et al. | 358/260 |
| 4,887,151 | 12/1989 | Wataya | 358/80 |
| 4,959,868 | 9/1990 | Tanioka | 382/41 |
| 5,014,198 | 5/1991 | Umemura | 364/413.13 |
| 5,065,446 | 11/1991 | Suzuki et al. | 382/56 |
| 5,073,953 | 12/1991 | Westdijk | 382/9 |
| 5,086,434 | 2/1992 | Abe et al. | 375/7 |
| 5,101,438 | 3/1992 | Kanda et al. | 382/9 |
| 5,151,949 | 9/1992 | Miyata | 382/9 |
| 5,157,743 | 10/1992 | Maeda et al. | 382/56 |
| 5,162,923 | 11/1992 | Yoshida et al. | 358/433 |
| 5,267,333 | 11/1993 | Aono et al. | 382/56 |
| 5,270,805 | 12/1993 | Abe et al. | 358/500 |

FOREIGN PATENT DOCUMENTS

| | | | |
|---|---|---|---|
| 1179778 | 12/1984 | Canada | 358/462 |
| 0130415 | 1/1985 | European Pat. Off. | 382/56 |
| 0283715 | 9/1988 | European Pat. Off. | H04N 1/41 |
| 0336317 | 10/1989 | European Pat. Off. | H04N 1/21 |
| 63-182785 | 7/1988 | Japan | G06F 15/68 |
| 63-299680 | 12/1988 | Japan | H04N 1/41 |
| 2-292959 | 12/1990 | Japan | H04N 1/41 |
| 2163026 | 2/1986 | United Kingdom | H04N 7/12 |

*Primary Examiner*—Andrew Johns
*Attorney, Agent, or Firm*—Fitzpatrick, Cella, Harper & Scinto

[57] ABSTRACT

Method and apparatus for efficiently encoding image data of a color facsimile or the like are provided. A specific color judgment unit discriminates a specific color portion such as white or blank portion of the image data inputted from an image input unit. An orthogonal transforming process is not executed to the blank block, thereby raising an encoding efficiency. A discrimination signal is subjected to a dynamic arithmetical encoding, thereby producing code data.

25 Claims, 16 Drawing Sheets

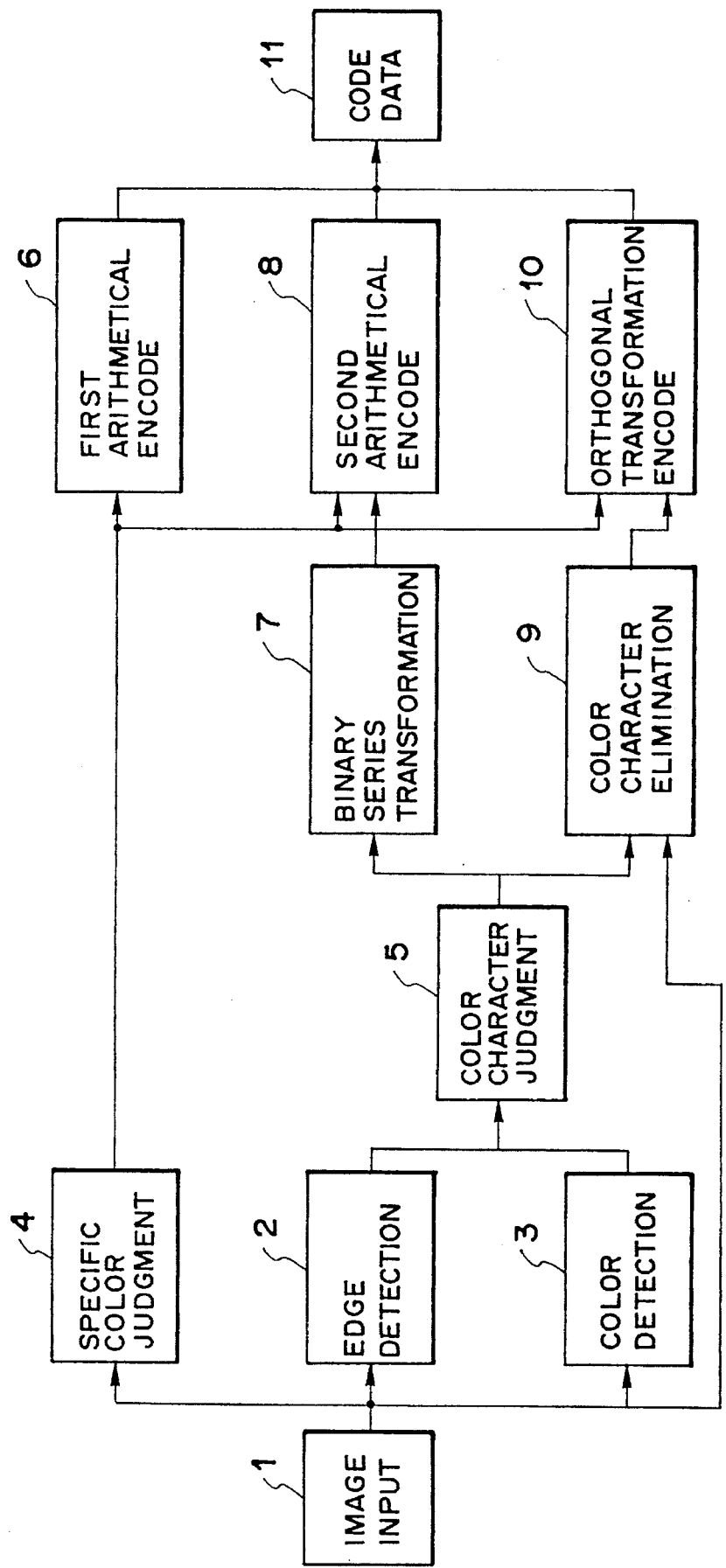

| COLOR | RGB | BINARY SERIES SIGNAL<br>MSB    LSB | LENGTH OF 0 |
|---|---|---|---|
| WHITE | 1 1 1 | 1 _ _ _ _ _ _ | 0 |
| BLACK | 0 0 0 | 0 1 _ _ _ _ _ | 1 |
| RED | 1 0 0 | 0 0 1 _ _ _ _ | 2 |
| GREEN | 0 1 0 | 0 0 0 1 _ _ _ | 3 |
| BLUE | 0 0 1 | 0 0 0 0 1 _ _ | 4 |
| CYAN | 0 1 1 | 0 0 0 0 0 1 _ | 5 |
| MAGENTA | 1 0 1 | 0 0 0 0 0 0 1 | 6 |
| YELLOW | 0 1 1 | 0 0 0 0 0 0 0 | 7 |

| 1 | 1 | 1 | 1 |
|---|---|---|---|
| 1 | 0 | 0 | 1 |
| 0 | 0 | 0 | 0 |
| 1 | 1 | 1 | 1 |

F I G. 8A

F I G. 8B

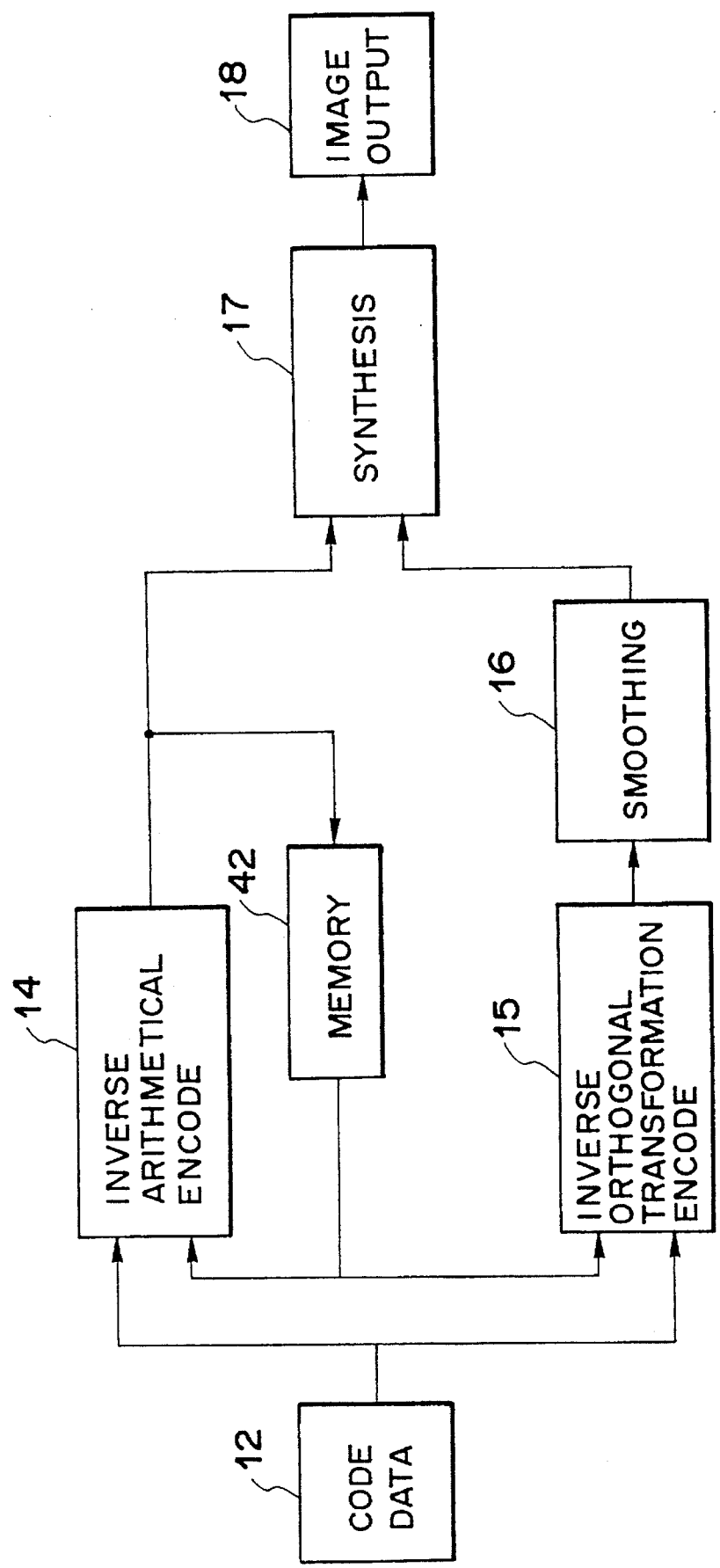

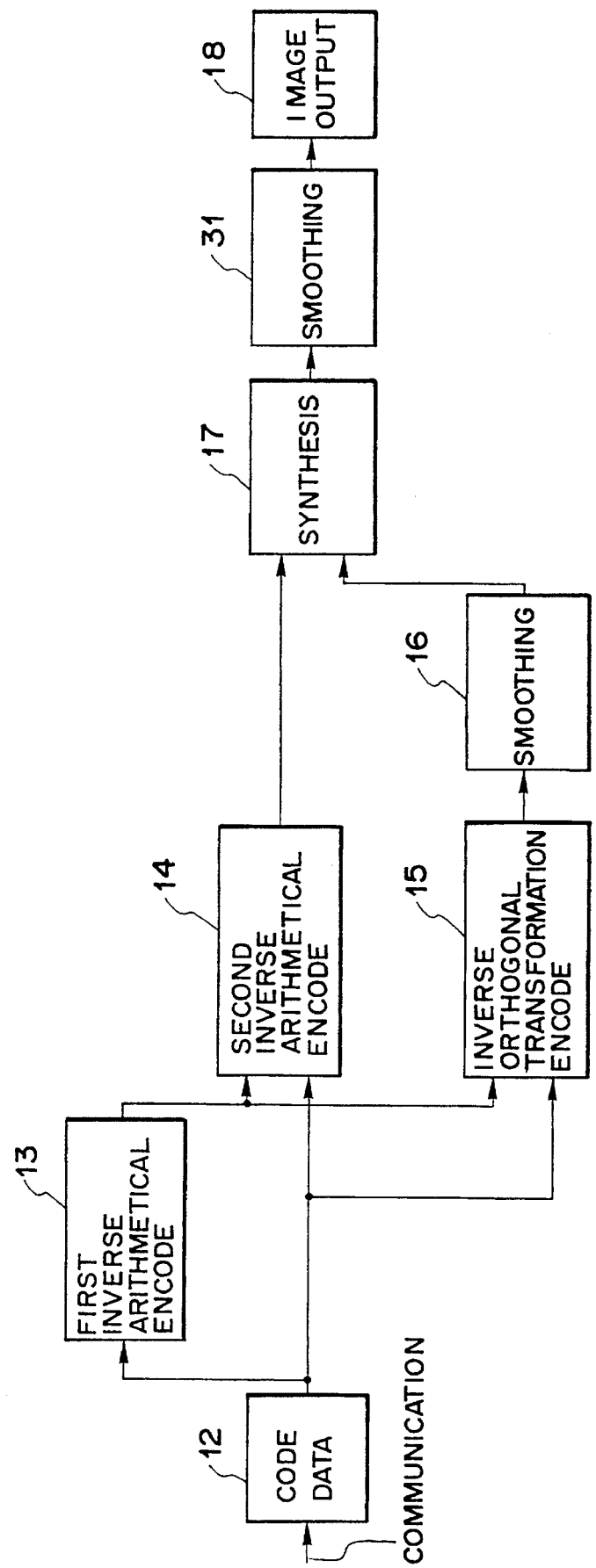

5,588,069

IMAGE PROCESSING APPARATUS FOR ADVANTAGEOUSLY ENCODING BLOCKS OF DATA HAVING EITHER SUBSTANTIALLY THE SAME OR VARIED COLORS

This application is a continuation of application Ser. No. 07/808,646 filed Dec. 17, 1991, now abandoned.

BACKGROUND OF THE INVENTION

1. Field of the Invention

The invention relates to image processing method and apparatus having the function of encoding or decoding a color image at high efficiency.

2. Related Background Art

Hitherto, as methods of encoding a color image, methods whereby an image is divided into a plurality of blocks and subjected to the orthogonal transformation and, thereafter, coefficients are quantized and encoded have been proposed by the same applicant as the present invention in U.S. Pat. Nos. 4,887,151, 5,157,743 and 3,162,923.

In the above conventional methods, however, since the coefficients after completion of the orthogonal transformation are quantized, the high frequency component is lost, a ringing occurs in the edge portion, and the quality of the character portion of an original deteriorates.

In the case of encoding at a low bit rate, a block distortion occurs at the boundary between blocks and an outline of a character becomes unsightly.

On the other hand, techniques to separately encode a plurality of color character portions and the other portions in order to improve qualities of black characters which are most frequently used and characters of a plurality of colors are proposed by the same applicant as the present invention in U.S. Pat. Nos. 5,146,606 and 5,361,147.

According to the above techniques, after the character portion and the other portions are separated, a DCT encoding is executed on the other portions.

In the DCT encoding, however, an image signal is converted into Y, $C_b$, and $C_r$ signals, the Y, $C_b$, and $C_r$ signals are respectively DCT encoded, the transformation coefficients are quantized and transformed into one-dimensional series, and Huffman encoding is executed. Therefore, even in the case of a "white" signal, namely, in the case where all of the input signal values in the block are equal to 255, a data amount of a total of three bits per block of at least one bit for each of the (Y, $C_b$, $C_r$) signals is necessary. Since the DC component which is obtained as a result of the orthogonal transformation uses another encoding (DPCM), a data amount of at least one bit per block is further needed, so that the loss of encoding efficiency is large.

When a diagram portion of a predetermined color of the input image data is extracted and the extracted diagram portion is encoded separately from the other portions, so long as only the diagram portion is merely eliminated, it is insufficient in terms of the accuracy of the extracting means or the like and, for instance, there is a case where the high frequency portion of the peripheral portion of the color characters remains. Such a problem also occurs in an image process such as a color converting process or the like other than the encoding process.

SUMMARY OF THE INVENTION

It is, therefore, an object of the invention to eliminate the drawbacks of the foregoing conventional techniques and to provide an image processing apparatus which can encode or decode an image at a high efficiency.

To solve the above object, according to the invention, there is disclosed an image processing apparatus comprising: discriminating means for discriminating whether all of pixels in a block composed of a plurality of pixels are substantially the same predetermined color or not; and encoding means for encoding by using an orthogonal transformation with respect to blocks other than the block which has been discriminated by the discriminating means that all of the pixels included in the block are substantially the same predetermined color.

Another object of the invention is to execute the encoding at a high efficiency in the case where an area of blank portions of an original is large.

To accomplish the above object, according to the invention, there is disclosed an image processing apparatus comprising: dividing means for dividing input image data into a plurality of blocks each of which is composed of a plurality of pixels; discriminating means for discriminating a white block from the divided blocks; and encoding means for encoding the divided blocks other than the white block discriminated by the discriminating means by using an orthogonal transformation method.

Still another object of the invention is to preferably encode a color reproducibility.

To accomplish the above object, according to the invention, there is disclosed an image processing apparatus comprising: input means for inputting image data in a pixel unit; first discriminating means for discriminating a color of the input image data in the pixel unit; second discriminating means for discriminating a single color of the input image data in a block unit in which the block is composed of a plurality of pixels; and encoding means for encoding the input image data in accordance with the discrimination results of the first and second discriminating means.

The above and other objects and features of the present invention will become apparent from the following detailed description and the appended claims with reference to the accompanying drawings.

BRIEF DESCRIPTION OF THE DRAWINGS

FIGS. 1A and 1B are block diagrams of an encoding apparatus according to the first embodiment of the invention;

FIGS. 8A and 8B are diagrams for explaining a specific color block and an interpolation in a decoding process;

FIGS. 9A and 9B are block diagrams showing a construction of the second embodiment of the invention;

FIGS. 12A and 12B are block diagrams showing a construction of the fourth embodiment of the invention.

DETAILED DESCRIPTION OF THE PREFERRED EMBODIMENTS

A preferred embodiment of the invention will be described hereinbelow with reference to the drawings.
(First embodiment)

FIG. 1 is a diagram showing the entire construction of an image encoding apparatus of the first embodiment of the invention.

Figure 1B:
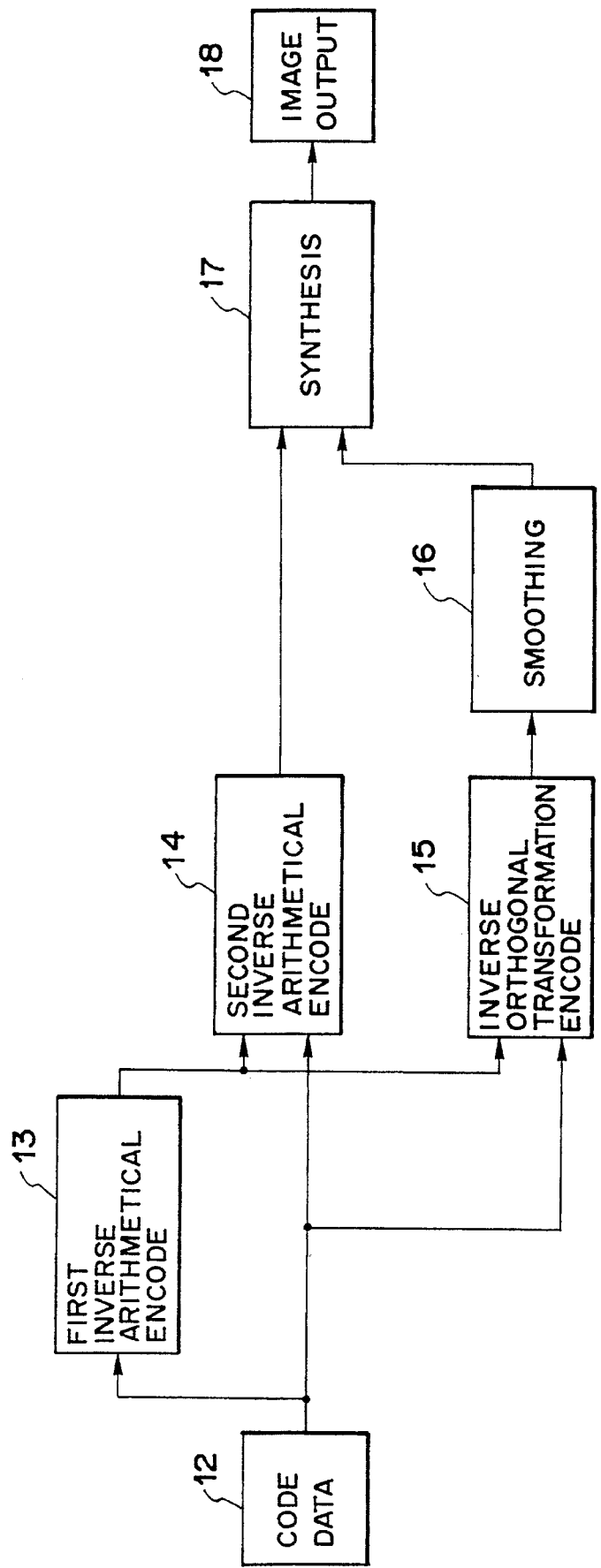

In FIGS. 1A and 1B, reference numeral 1 denotes an image input unit to input an image signal indicative of an original. The image input unit 1 is constructed by an image reader for scanning the original by a CCD line sensor and generating color component signals of R (red), G (green), and B (blue) each consisting of eight bits every pixel. Reference numeral 2 denotes an edge detection unit to detect the portion of the high frequency component of the original image by a method, which will be explained hereinlater. Reference numeral 3 denotes a color detection unit to detect the pixels of a predetermined color component; 4 indicates a specific color judgment circuit to discriminate where all of the pixel values in a block are a specific color (for instance, all white) or not; 5 a color character judgment unit to discriminate the pixels in the edge portion and of a predetermined color component; 6 a first arithmetical encode circuit to encode an output from the specific color judgment circuit 4 by an algorithm for dynamic arithmetical encoding; 7 a binary series transformation unit to transform pixel data indicative of a plurality of colors into a binary series signal suitable for arithmetical encoding; and 8 a second arithmetical encode unit which is constructed in a manner such that when the target pixel to be encoded relates to a block constructed by a specific color on the basis of a signal generated from the specific color judgment circuit 4, no process is performed, and when the target pixel to be encoded is not the specific color, the binary series signal is encoded by the dynamic arithmetical encoding. Reference numeral 9 denotes a color character elimination unit to substitute the data of the pixel which has been determined to be a color character by average value data of the block to which such a pixel belongs. Reference numeral 10 denotes an orthogonal transformation unit for executing the encoding of what is called an ADCT system such that a DCT (Discrete Cosine Transform) is performed every block and a Huffman encoding is further executed. In a manner similar to the case of the second arithmetical encode unit 8, when a target block to be ADCT encoded is a specific color, no process is executed, and only when it is not a specific color, the ADCT encoding is performed. Reference numeral 11 denotes a code data transmission unit for integrating outputs of the first and second arithmetical encode units 6 and 8 and orthogonal transformation unit 10, thereby producing code data to be transmitted. In FIG. 1B reference numeral 12 denotes a code data reception unit to separate the received code data into two arithmetical encode series and Huffman encode series. Reference numeral 13 denotes a first inverse arithmetical encode unit for decoding an arithmetical code and generating a signal indicating whether the target block is a block of a specific color or not; 14 a second inverse arithmetical encode unit for decoding an arithmetical code and generating color character data; and 15 an inverse orthogonal transformation unit for executing a Huffman decoding and an inverse orthogonal transformation and for generating multi-value image data.

When the target pixel and target block are a specific color, the second inverse arithmetical encode unit 14 and inverse orthogonal transformation unit 15 stop the decoding operations and generate values of the specific color. When they are not a specific color, the units 14 and 15 execute the decoding operations and generate dencoded data. Reference numeral 16 denotes a smoothing unit to execute a smoothing process in order to eliminate a block distortion of the dencoded image; 17 a synthesis unit for synthesizing the color character and the multi-value image data and for generating image data to be reproduced; and 18 an image output unit to form a visible image from the image data.

Each of the above units will now be described hereinbelow.
(Edge detection unit 2)

Figures 2, 3:
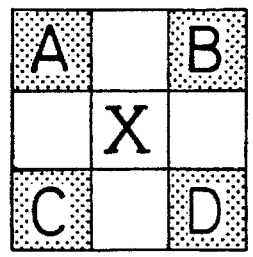
FIG. 2 is a diagram for explaining an edge detection.
FIG. 3 is a diagram for explaining a binary series transformation.

In the edge detection unit 2, the following arithmetic operations are executed among peripheral pixels A, B, C and D as shown in FIG. 2 for a target pixel X, a distance between two points in an RGB space is calculated, and an edge in the image is detected. That is, now assuming that image data of the target pixel and peripheral pixel are set to $(X_r, X_g, X_b)$ and $(A_r, A_g, A_b)$ respectively, it is determined that an edge exists between the pixels X and A when the following relations (1) and (2) are satisfied.

$$S=\{(X_r-A_r)^2+(X_g-A_g)^2+(X_b-A_b)^2\}^{1/2} \qquad (1)$$

$$S>TH_1(=100) \qquad (2)$$

Similarly, the presence or absence of an edge is also judged with respect to portions between the pixels X and B, between the pixels X and C, and between the pixels X and D. When the edge exists in any one of the portions between the pixel X and the pixels A, B, C and D, it is determined that the target pixel X is an edge.

Since the presence or absence of the edge is judged by calculating the distances between the target pixel and the peripheral pixels on the three-dimensional space, for instance, color edges in which the brightnesses are equal and the hues and saturations are different can be also judged. Therefore, the above method is extremely effective to detect color characters in the invention.

In addition to the edge judgment of every pixel, a check is also made to see if an edge pixel is included or not in a block of 8×8 pixels in which a color character elimination and an orthogonal transformation, which will be explained hereinlater, are executed. A discrimination signal is also generated. The above discrimination can be realized by getting the OR of the discrimination result of every pixel in the block.

A method of picking up the peripheral pixels is not limited to the above example but, for instance, eight peripheral pixels can be also taken.

For instance, it is also possible to calculate the average value of the image data of pixels A, B, C and D and to execute the foregoing arithmetic operation between the average value and the pixel X.

Another well-known method may be also used to detect an edge.
(Color detection unit 3)

The color detection unit 3 detects a plurality of predetermined limit colors by the following expressions. Now, assuming that the image data of the target pixel X is set to (r, g, b), when $r,g,b<th_1$ and $$|r-g|,|g-b|,|b-r|<th_3 \quad (3)$$

are satisfied, it is determined that the target pixel X is K (black).

In a manner similar to the above, the color of the target pixel X is detected as follows.

$X=R$(red)

when$(r>th_2)$and$(g, b<th_1)$and$(|g-b|<th_3)$ (4)

$X=G$(green)

when$(g>th_2)$and$(r,b<th_1)$and$(|r-b|<th_3)$ (5)

$X=B$(blue)

when$(b>th_2)$and$(r,g<th_1)$and$(|r-g|<th_3)$ (6)

$X=Y$(yellow)

when$(r,g>th_2)$and$(b<th_1)$and$(|r-g|<th_3)$(7)

$X=M$(magenta)

when$(r,b>th_2)$and$(g<th_1)$and$(|r-b|<th_3)$ (8)

$X=C$(cyan)

when$(g,b>th_2)$and$(r<th_1)$and$(|g-b|<th_3)$ (9)

$th_1$, $th_2$ and $th_3$ denote predetermined threshold values. For instance, assuming that $th_1=50$, $th_2=205$, and $th_3=30$, it is decided that the detection result is good.

The color detection signal is expressed by three bits of (R, G, B). The correspondence relations between each of the detected colors and the values of R, G and B are as shown in FIG. 3.

(Specific color judgment unit 4)

The specific color judgment unit 4 determines that a block is a specific color block when all of the pixel values in the block coincides with the specific color value.

(Color character judgment unit 5)

The color character judgment unit 5 determines that the pixels which satisfy either one of the above expressions (3) to (9) by the color detection unit 3 among the pixels in the block which has been decided by the edge detection unit 2 that the pixels corresponding to the edge exist are a color character.

(First arithmetical encode unit 6)

The arithmetical encode unit 6 encodes a binary signal by an arithmetical encoding as a reversible encoding. A method and a circuit construction for arithmetical encoding are as shown in U.S. Pat. No. 5,136,396.

(Binary series transformation unit 7)

The binary series transformation unit 7 transforms color signals of eight colors which are expressed by a color character discrimination signal of three bits into a binary series signal shown in FIG. 3.

Figure 4:
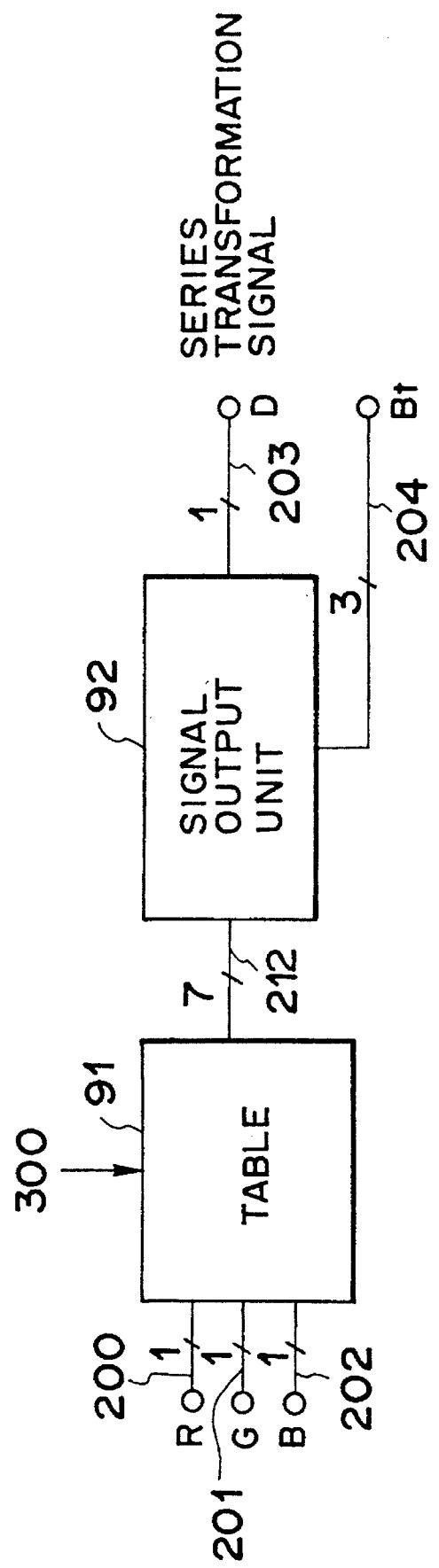
FIG. 4 is a block diagram showing a construction of a binary series transformation unit.

FIG. 4 shows a block diagram of the binary series transformation unit 7. Input data 200 to 202 are converted into a signal 212 of maximum seven bits shown in FIG. 3 every pixel by a transformation table 91 which is constructed by an ROM or the like. The signal 212 is supplied to a signal output unit 92. It is also possible to prepare a plurality of ROMS for the transformation table 91 so as to allocate a short bit length to the color in which a frequency of appearance is large, thereby enabling either one of the plurality of ROMs to be selected in accordance with a control signal 300.

The signal output unit 92 has a construction of a shift register. The input signals 212 of seven bits are supplied in parallel and are serially generated one bit by one from the MSB. Such signals are a binary series signal D 203. When the binary series signal is set to 1 or seven bits of "0" are generated, the signal output unit 92 finishes the generation of the color signal of one pixel and receives the next input data. The signal output unit 92 generates a signal $B_t$ 204 indicating which number of bit of the binary series signal the bit which is at present generated belongs to.

By binary series transforming the color character discrimination signal of three bits and encoding as a serial signal of one bit, the signals of three bits having a correlation can be encoded while keeping the color correlation without individually encoding them. Moreover, for instance, when performing the encoding while predicting the target pixel like the arithmetical encoding, the prediction and encoding can be performed as color information without executing the prediction and encoding every color component of R, G and B and the encoding efficiency can be raised.

Since each of the color components of R, G and B indicative of the color of each pixel is expressed as one data, by decoding one data upon decoding, the R, G and B signals corresponding to the respective pixels can be obtained in a lump and a color image can be promptly reproduced.

(Arithmetical encode unit 8)

In the arithmetical encode unit 8, a binary series signal indicative of a few colors is encoded by an arithmetical encoding as a reversible encoding. A method and a circuit construction for arithmetical encoding are as shown in U.S. Pat. No. 5,136,396. In the above case, the encoding process is executed to only the data of a non-specific color block and the data of a specific color block is not encoded.

(Color character elimination unit 9)

The color character elimination unit 9 substitutes the data of the pixels which have been determined to be a color character by the color character judgment unit 5 by using the value corresponding to the data of the other pixels in the block to which those pixels belong.

Figure 5A:
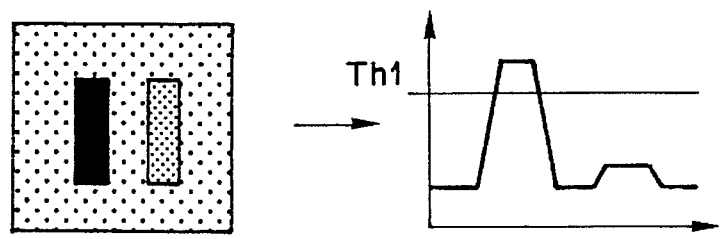
FIGS. 5A to 5C are diagrams for explaining an elimination of color characters.
Figure 5B:
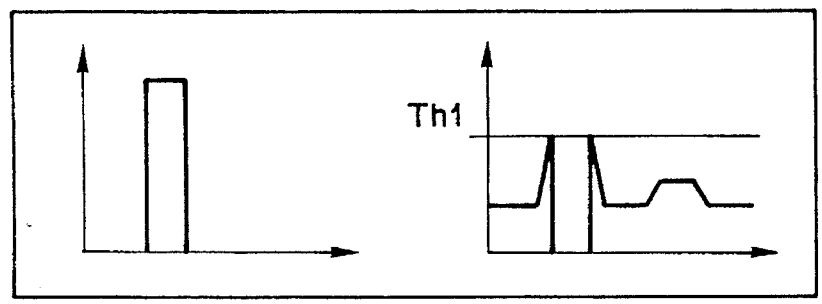
Figure 5C:
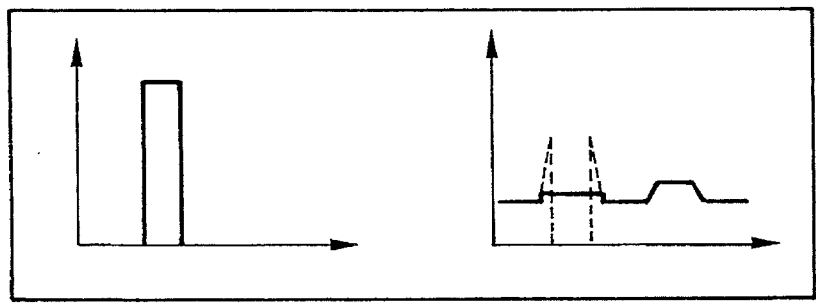

That is, color character data is eliminated as shown in FIG. 5B from the image in which a color character exists as shown in FIG. 5A. In the above case, since the edge which occurs as shown in FIG. 5B is also eliminated by subtracting the color character, the data of the pixels which exist around the color character as shown in FIG. 5C and have the hue similar to that of the pixels of the color character is also subtracted and is substituted by the average value of the other pixel data in the block.

In the above case, the size of block which is subjected to the color character eliminating process and the size of block which is subjected to an orthogonal transformation, which will be explained hereinlater, are the same.

Figure 6:
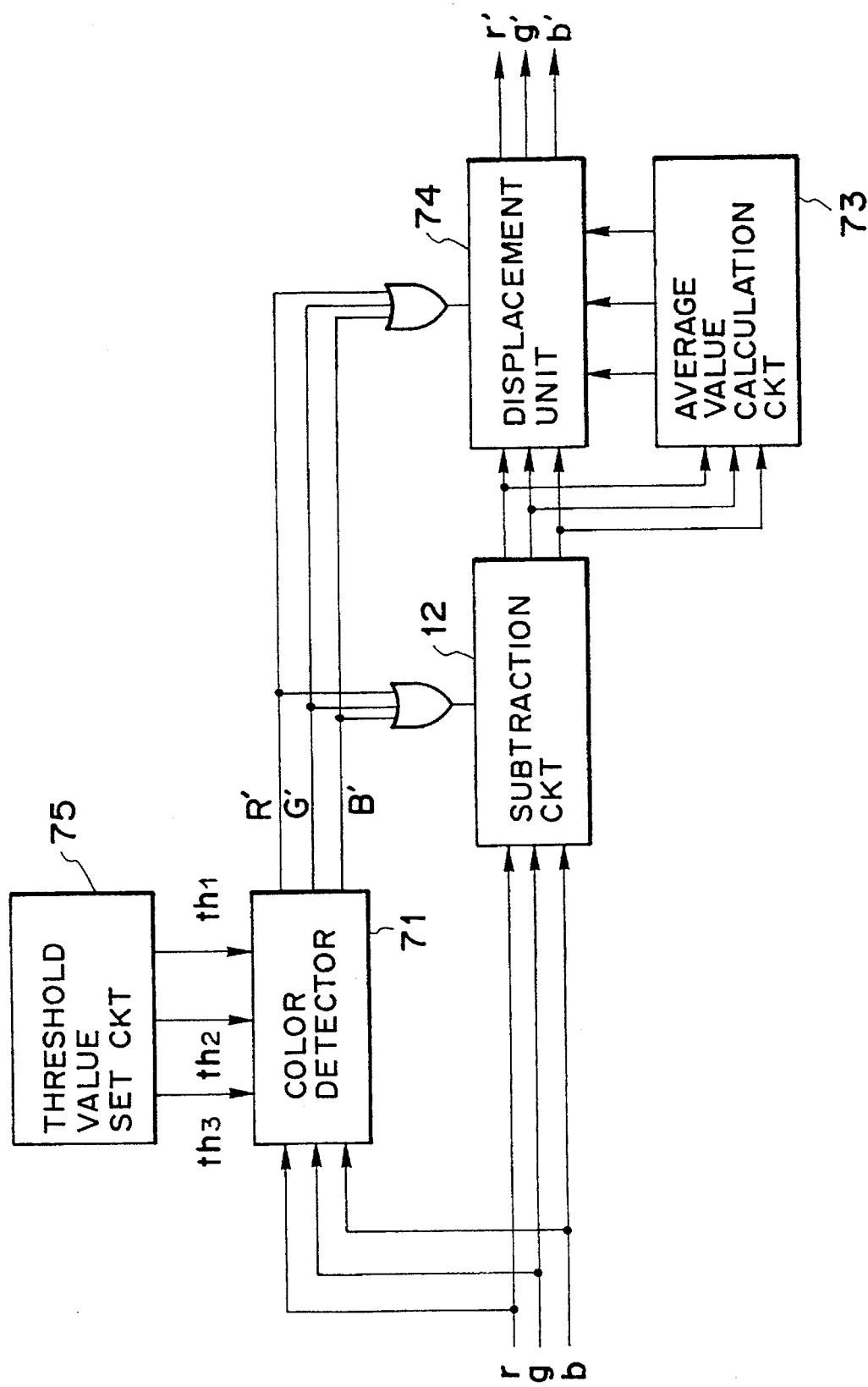
FIG. 6 is a block diagram showing a construction of a color character elimination unit.

A construction of the color character elimination unit 9 is shown in FIG. 6.

The pixel image data r, g and b each consisting of eight bits are supplied to a color detector 71. The pixels of the color to be eliminated are detected on the basis of the above expressions (3) to (9). At this time, the threshold values are set, for instance, as follows so as to enable the color character peripheral portion to be also detected.

$$th_1=120, th_2=130, th_3=30$$

As mentioned above, by changing (reducing) the threshold values of the color detection which are set by a threshold value setting circuit 75 and executing the color detection in a range wider than that of the color detection unit 3, the portion of the color which is approximate to the color of the color character can be extracted and the input image data in this portion can be also eliminated.

When at least one of detection signals R', G' and B' of the color detector 71 is set to 1, it is decided that the pixels is a pixel in which the color to be eliminated exists. In a subtraction circuit 72, the values of r, g and b of such a pixel are set to 0. In an average value calculation circuit 73, the average value of the data r, g and b in the block of 8×8 pixels is calculated. In a displacement unit 74, the average value is substituted as image data of the pixels in which the color has been eliminated and such image data is generated as r', g' and b'.

The invention is not limited to the substitution by the average value but it is also possible to substitute by a value whose frequency is highest or to substitute by a central value of the pixels in the block by using a median filter.

In order to more accurately extract only the real color portion which corresponds to the pixels around the color character and is approximate to the color character, it is also possible to get the AND of a signal indicative of the OR of the color character discrimination signals R, G and B and output signals of two OR circuits in FIG. 6 and to execute processes in the subtraction circuit 72 and displacement unit 74.

(Orthogonal transformation encode unit 10)

The orthogonal transformation encode unit 10 executes an encoding of what is called an ADCT system in which a two-dimensional discrete cosine transformation is executed on a block unit basis of 8×8 pixels and the resultant transformation coefficients are quantized and, thereafter, they are Huffman encoded.

Figure 7:
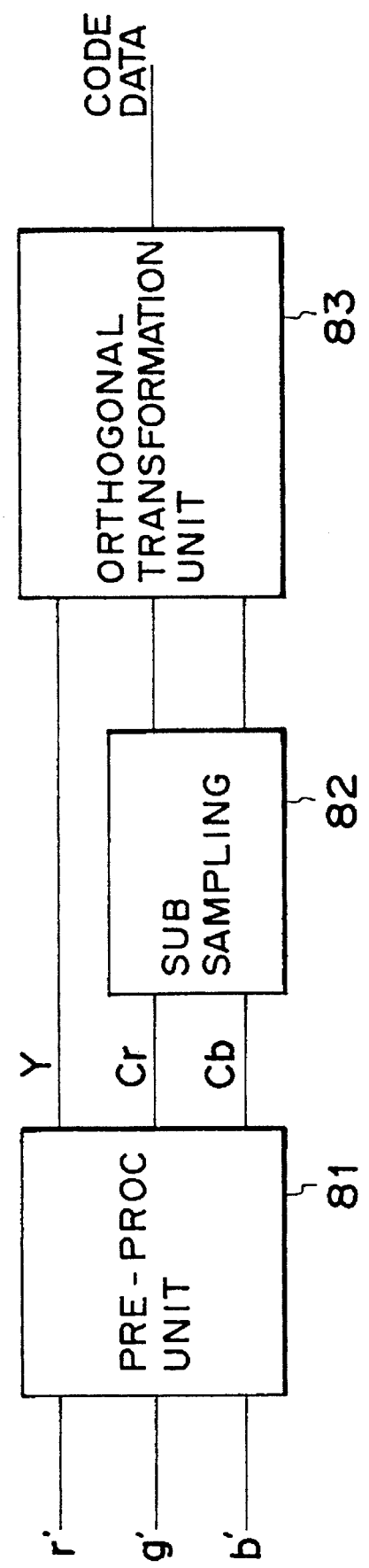
FIG. 7 is a block diagram showing a construction of an orthogonal transformation unit.

FIG. 7 shows a construction of the orthogonal transformation encode unit 10. In a pre-processing unit 81, signals of eight bits of r', g' and b' are converted into a luminance signal Y and chromaticity signals $C_r$ and $C_b$ every pixel. In a sub sampling unit 82, average values are calculated from the $C_r$ and $C_b$ signals every block of 2×2 pixels. The above processes are executed by using a characteristic such that the deterioration in chromaticity signal is difficult to be perceived by the human sense of sight as compared with the deterioration of the luminance signal. In an orthogonal transformation unit 83, finally, the encoding of the ADCT system is independently executed with respect to each frame of Y, $C_r$ and $C_b$. Such an encoding can be executed by constructing an exclusive arithmetic operating circuit or by a software of a computer. In the sub sampling unit 82, sub samples can be also obtained by merely thinning out the data.

The orthogonal transformation encode unit 10 executes the encoding process only when the block to be processed is a non-specific color. When it is the specific color, the encode unit 10 doesn't perform the encoding process. Ordinarily, for the $C_b$ and $C_r$ data, two blocks are converted into one block by the sub sampling. However, in the case where one of the two blocks is the specific color, the sub sampling is not performed but the $C_b$ and $C_r$ data of the block of the non-specific color are directly used for the orthogonal transformation.

(Encode data transmission unit 11)

In the encode data transmission unit 11, the data of the specific color block of the first arithmetical encode unit 6 is first transmitted, the pattern code of the color character of the second arithmetical encode unit 8 is subsequently transmitted, and the code data of Y, $C_r$ and $C_b$ of the orthogonal transformation encode unit 10 are finally frame-sequentially transmitted. A frag indicating to which component the data belongs is transmitted prior to the transmission of each frame. In the above case, the transmission unit 11 has a memory to compensate a time deviation according to the transmitting order of each data.

By encoding the color character pattern by the reversible encoding as mentioned above, a high efficient data compression can be executed while keeping the quality of the color character.

On the other hand, when the color character is separated from the original data, by executing a predetermined displacement while also including the peripheral portion of the color character, the orthogonal transformation encoding efficiency can be improved.

(Encode data reception unit 12)

The encode data reception unit 12 receives the code data from the transmission unit 11 and discriminates whether it is the arithmetical code or the Huffman code of either one of Y, $C_r$ and $C_b$ on the basis of the flag and generates each data to the inverse arithmetical encode units 13 and 14 and an inverse orthogonal transformation encode unit 15.

(First inverse arithmetical encode unit 13, second inverse arithmetical encode unit 14, inverse orthogonal transformation encode unit 15)

The first inverse arithmetical encode unit 13, second inverse arithmetical encode unit 14, and inverse orthogonal transformation encode unit 15 decode the data indicative of the specific color block, color character data, and multi-value data of r', g' and b' in accordance with a procedure which is opposite to that for the arithmetical encoding and orthogonal transformation encoding. Since the data which are dencoded by the second inverse arithmetical encode unit 14 and inverse orthogonal transformation unit 15 are the data of the portions excluding the specific color block, it is necessary to supplement the specific color block portion and to reconstruct in each unit. For instance, the specific color mentioned here assumes white. The whole image size is set to 8×8 pixels and the block size is set to 2×2 pixels for simplicity of explanation.

Figures 8A, 8B:
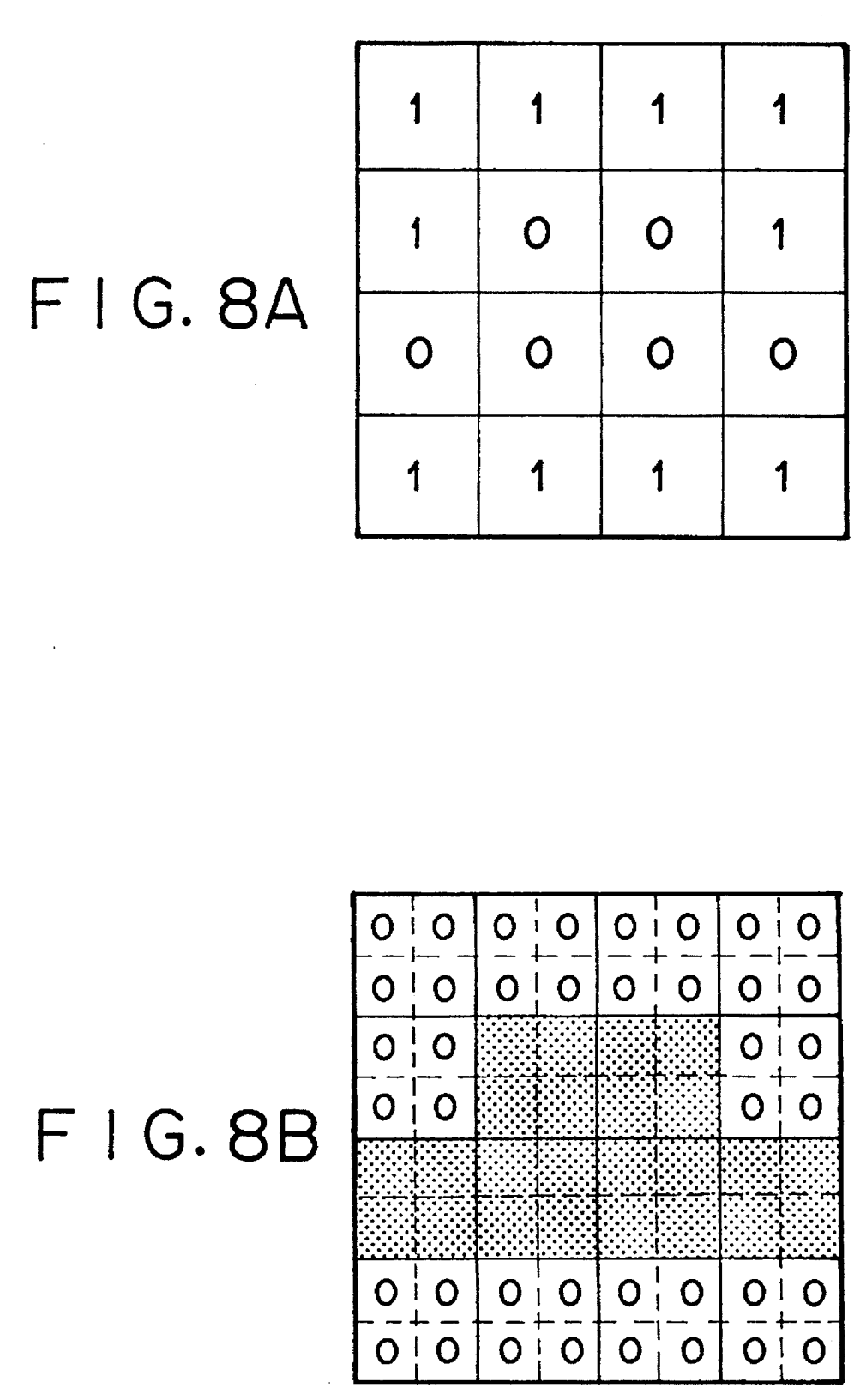

It is now assumed that the specific color blocks exist as shown in FIG. 8A. Reference numeral 1 denotes the specific color block and 0 indicates the non-specific color block. The number of data which are dencoded by the second inverse arithmetical encode unit 14 corresponds to only the portions of the non-specific color blocks and corresponds to 24 pixels (4×6 blocks) here. As shown in FIG. 8B, therefore, the specific color 0 is supplemented to the portions corresponding to the specific color blocks and the dencoded data is inserted into the portions (hatched portions in the diagram) corresponding to the non-specific color blocks. The inverse orthogonal transformation encode unit 15 also operates in a manner similar to the above.

The dencoded multi-value data of r', g' and b' is smoothed at each frame by the smoothing unit 16. The reason why the smoothing process is not performed to the color character data but is executed to only the multi-value data is to prevent the deterioration in resolution of the color character and to reproduce a clear color character.

(Synthesis unit 17)

The synthesis unit 17 synthesizes the dencoded color character data and the multi-value data of r', g' and b'.

That is, the results (R×a, G×a, B×a) in which a predetermined coefficient a has been multiplied to the color character data (R, G, B) and the multi-value data (r', g', b') are synthesized. Upon synthesis, a priority is given to the color character data as image data of the pixels in which the color character exists. Due to this, the color character can be clearly reproduced.

(Image output unit 18)

The image output unit 18 is, for instance, an image output device such as laser beam printer, LED printer, liquid crystal printer, thermal copy transfer printer, dot printer, ink jet printer, or the like or an image display device such as a CRT or the like. The image output unit 18 forms a visible image onto a recording medium in accordance with a reproduction signal.

Particularly, the ink jet printer includes what is called a bubble jet printer using a head of the type to emit a liquid droplet by a film boiling using a heat energy.

(Second embodiment)

Figure 9A:
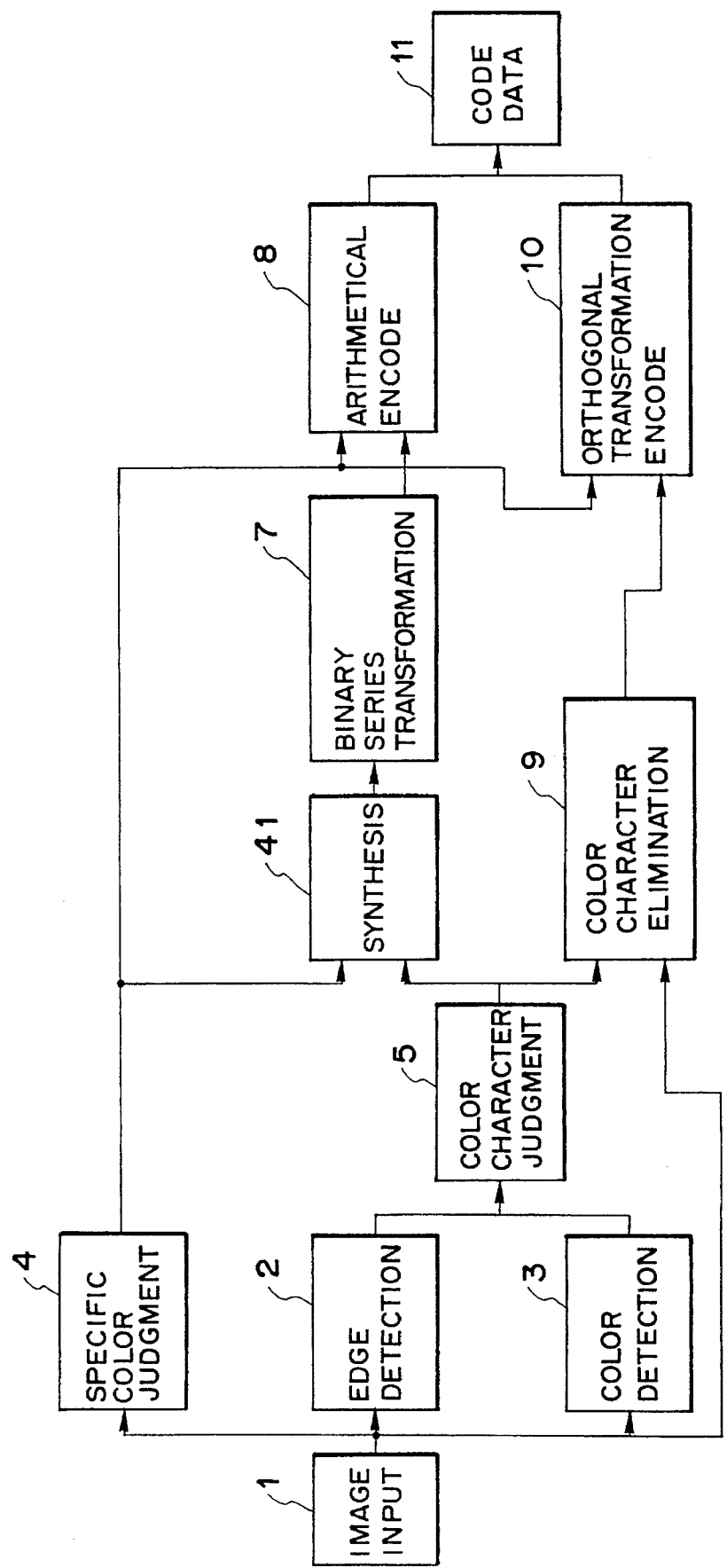
Figure 10:
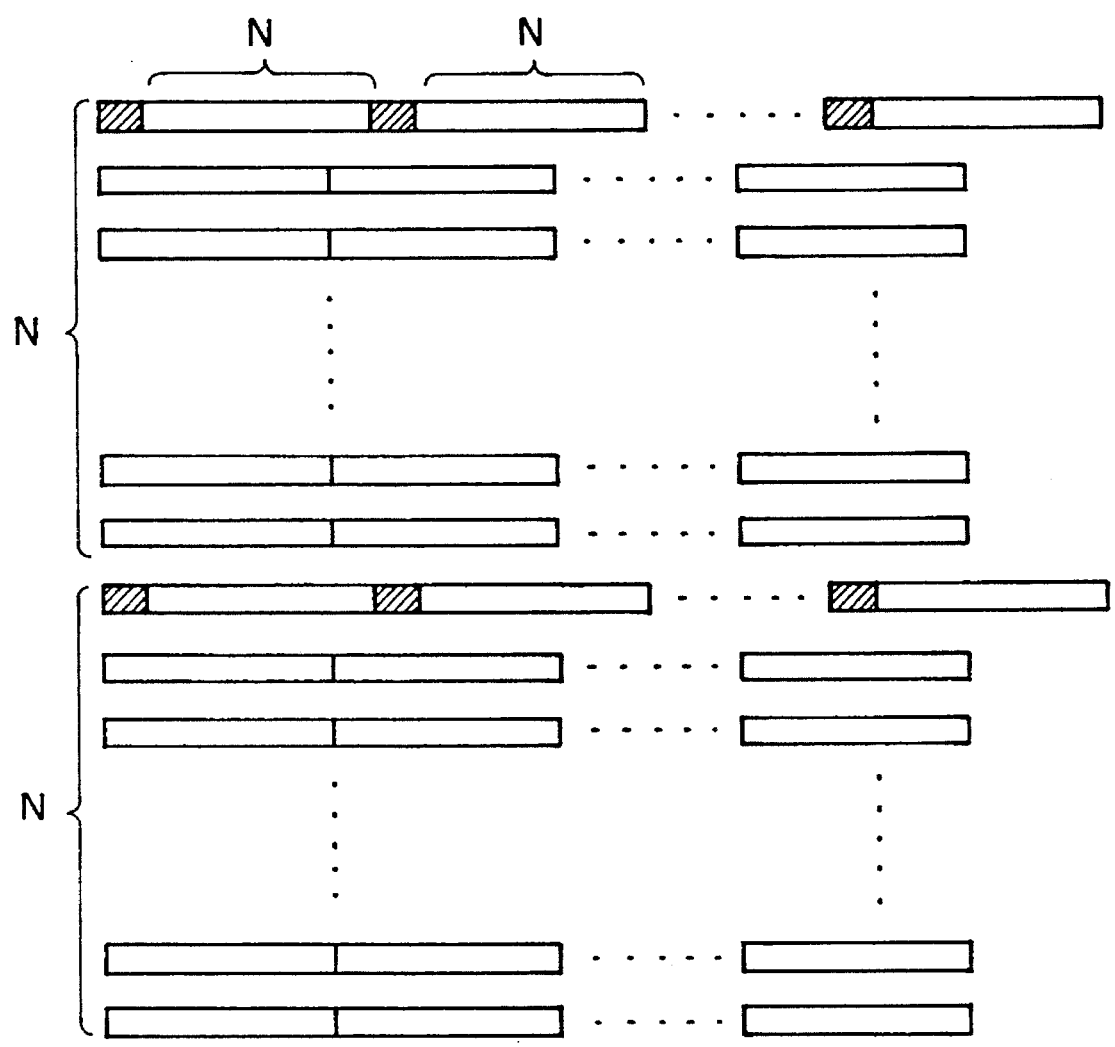
FIG. 10 is a diagram for explaining at which position in a binary signal series the judgment data of the specific color block is inserted.

FIGS. 9A and 9B show embodiments in the cases where parts of the two arithmetical encode units in the first embodiment are modified. Since the component elements designated by reference numerals 1 to 18 are similar to those in FIGS. 1A and 1B, their descriptions are omitted. Reference numeral 41 denotes a mixer to mix the color character data and the specific color block discrimination data. For example, the mixer inserts the specific color block discrimination data to the head of the data of each block. An output from the mixer 41 is as shown in FIG. 10. Hatched portions indicate the specific color block discrimination data. By constructing as mentioned above, there is no need to use a plurality of arithmetical encode units. In the arithmetical encode unit 8, the specific color block discrimination data is certainly encoded. However, the other color character data is not encoded in the case of the data of the specific color block as mentioned above but is encoded only in the case of the data of the non-specific color block. Reference numeral 42 in FIG. 9B denotes a memory to store the dencoded specific color block discrimination data (FIG. 8A).

(Third embodiment)

The invention is not limited to the image communicating apparatus such as a color facsimile apparatus or the like but can be also applied to a memory device such as an image file or the like.

Figure 11A:
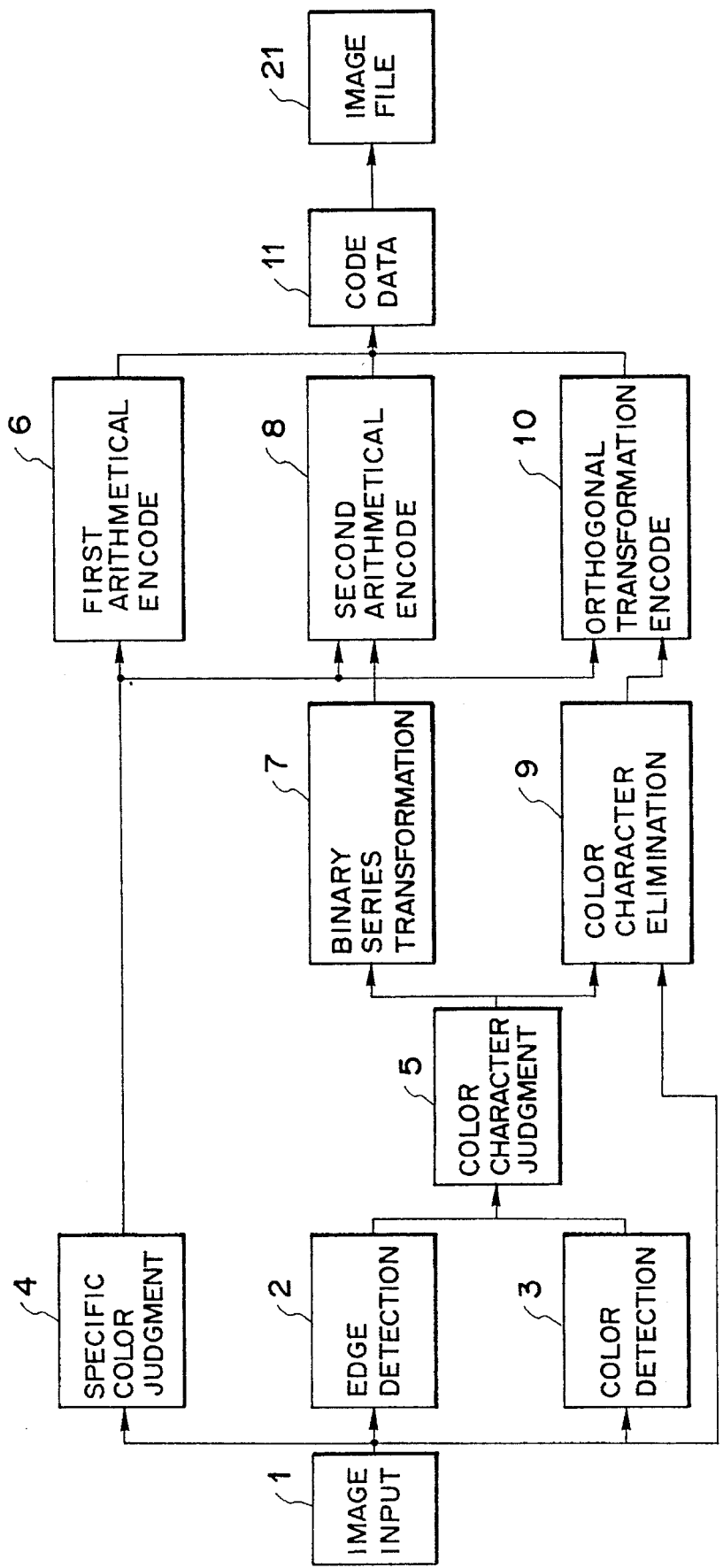
FIGS. 11A and 11B are block diagrams showing a construction of the third embodiment of the invention.
Figure 11B:
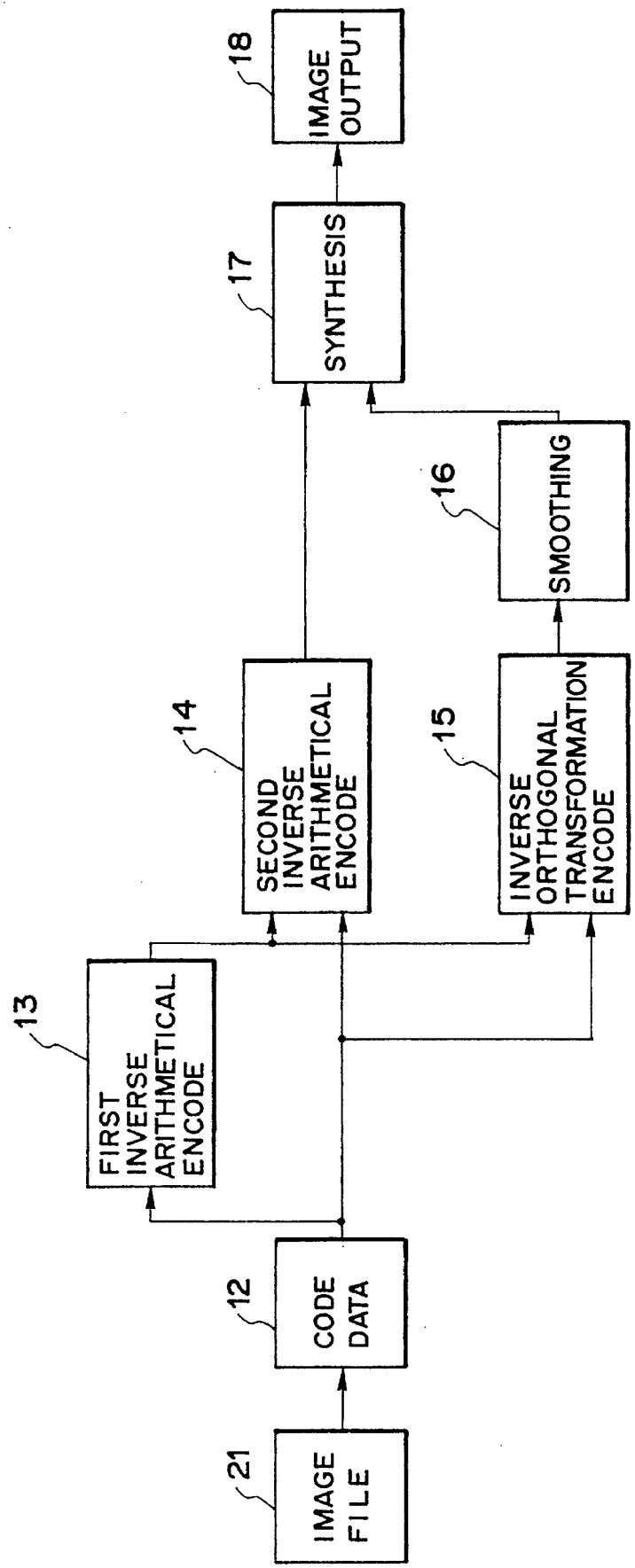
Figure 12A:
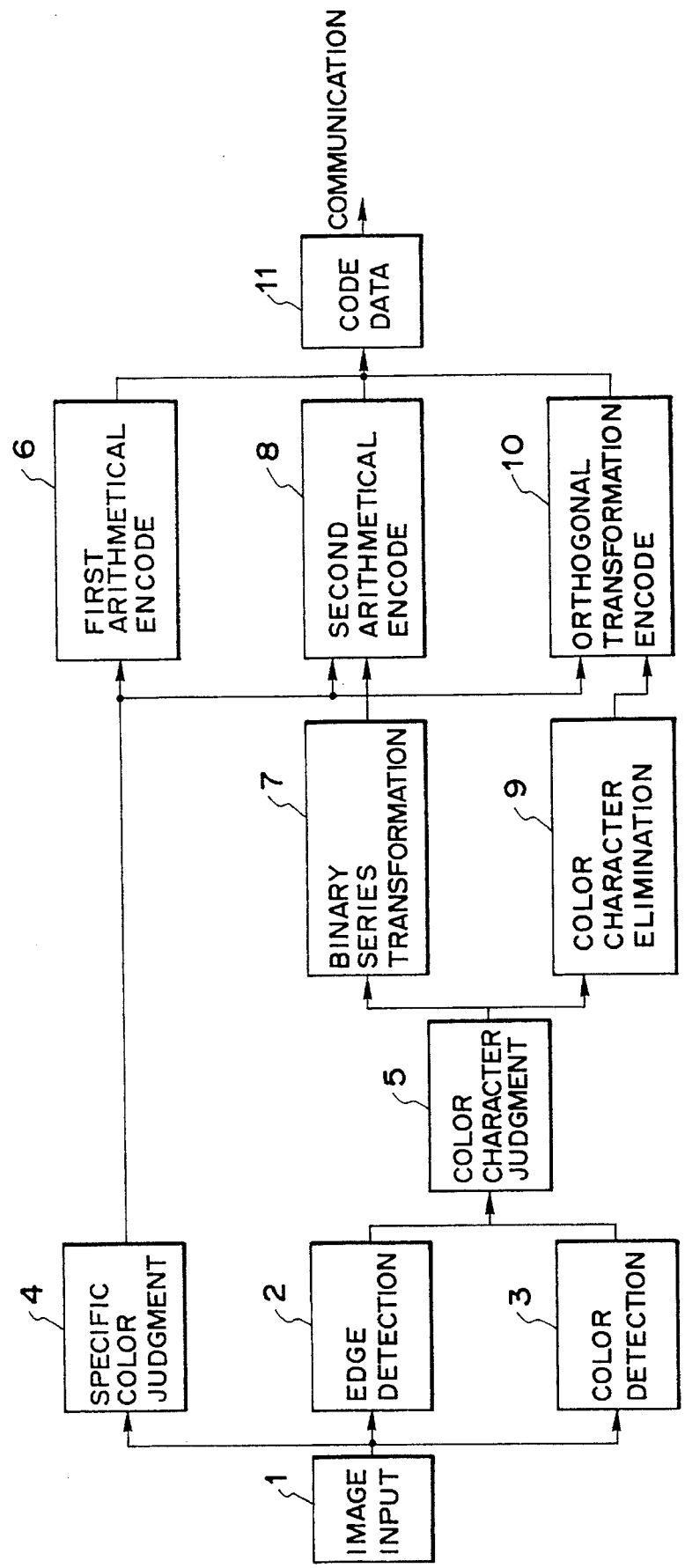

FIGS. 11A and 11B show examples in the cases where the invention is applied to a memory device. In FIGS. 11A and 11B, since the component elements which are designated by reference numerals 1 to 18 are similar to those in FIGS. 1A and 1B, their descriptions are omitted. Reference numeral 21 denotes an image file comprising a magnetooptic disk, a hard disk, an ROM, an RAM, or the like. The image file 21 can store a plurality of images. When images are stored, the arithmetical code and the Huffman code can be separately stored or they can be also stored in a lump every image. For instance, in the case where only the character portion is used by a display or a hard copy, it is sufficient to decode only the arithmetical code and, in such a case, the processing time can be reduced.

(Fourth embodiment)

According to the fourth embodiment, in addition to the construction of the first embodiment, a smoothing unit 31 is further added after the image synthesis unit 14 upon decoding.

For instance, a smoothing filter of a block of 3×3 pixels can be used for smoothing. A coefficient such as to calculate a weighted mean of the target pixel and the peripheral pixel can be also used as a filter coefficient.

According to the embodiment, since the smoothing process is also executed after the color character and the multi-value image were synthesized, it is possible to prevent that the boundary between the color character portion and the multi-value image becomes unnatural. The above smoothing process is particularly effective in the case where an original in which characters and a natural image mixedly exist is read by a CCD sensor. Therefore, for instance, in the case of an image such as computer graphics in which characters can be clearly separated, it is not always necessary to perform the smoothing process.

It is also possible to provide a circuit to discriminate a feature (character or half-tone) of an image into the smoothing unit 31 and to thereby execute the smoothing process to only the half-tone portion.

According to the embodiment of the invention as mentioned above, a block constructed by the specific color (for instance, white) in which an appearance frequency is high in the input image is extracted and the specific color block portion is not encoded, so that the encoding efficiency can be improved.

Since the color character portions existing in the input image are simultaneously detected and are simultaneously encoded, a plurality of color characters can be promptly encoded. Moreover, by encoding those portions separately from the gradation image portions, the high efficient encoding can be executed while maintaining a high quality. That is, the non-reversible high efficient encoding is executed to the gradation image and in order to cover the drawback such that the high frequency component is lost by the encoding of the gradation image, the edge portions, particularly, the color character portions are entropy encoded, so that the ringing is prevented and the color character portions can be reproduced at a high quality.

On the other hand, in addition to the color character portions, the color portions around the portion of a hue which is almost equal to the hues of the color character portions are also eliminated from the gradation image and are subjected to a predetermined displacement, so that the efficiency of the gradation image is remarkably improved.

The image input unit 1 is not limited to the CCD line sensor but may be an interface to generate the processing result of a computer, a still video camera to record still images, a video camera to record moving images, or the like.

Especially, as an interface of a computer, for instance, an interpreter of a page describing language such as post script, PCL, or the like is included.

The input signal is also not limited to the color components of R, G and B but may be a signal such as (Y, I, Q), (L*, a*, b*), (L*, u*, v*) (Y, M, C), or the like.

The color component signals for color detection are also likewise not limited to the foregoing R, G and B signals.

The encoding method of the color character is not limited to the binary series transformation or the arithmetical encoding but may be another reversible encoding such as run length encoding, MH, MR, MMR, or the like.

The encoding method of a multi-value image is also not limited to the non-reversible encoding such as an ADCT or the like but may be a vector quantization or another orthogonal transformation encoding.

The kinds and number of color characters to be detected are also not limited to the foregoing examples.

Figure 13A:
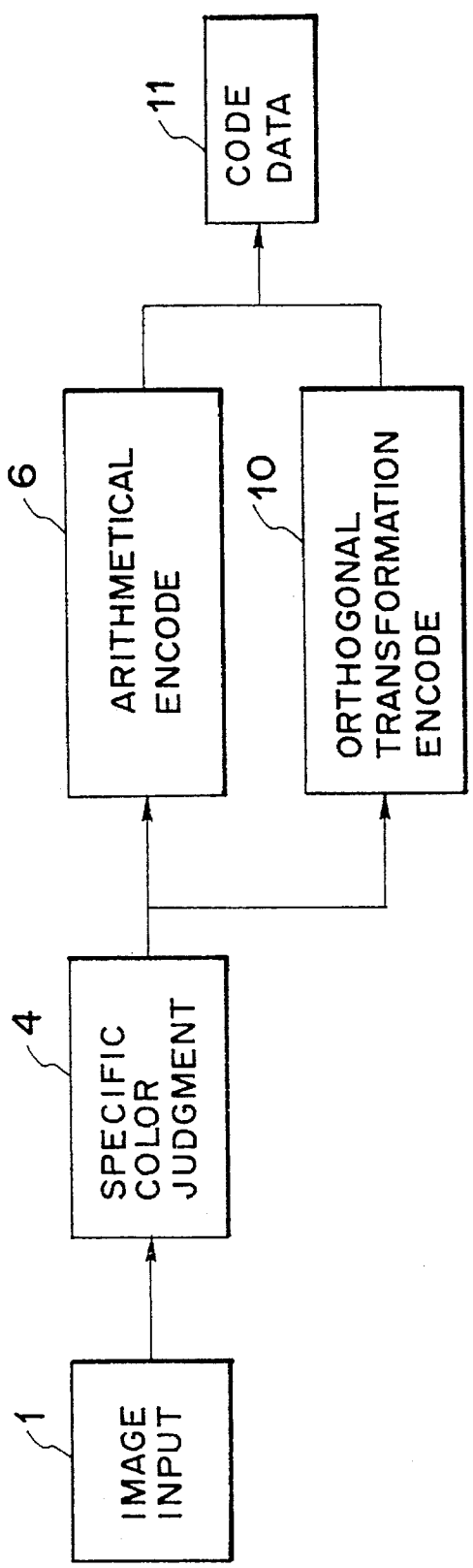
FIGS. 13A and 13B are block diagrams showing an example in which the invention is applied to an encoding apparatus by only a DCT.
Figure 13B:
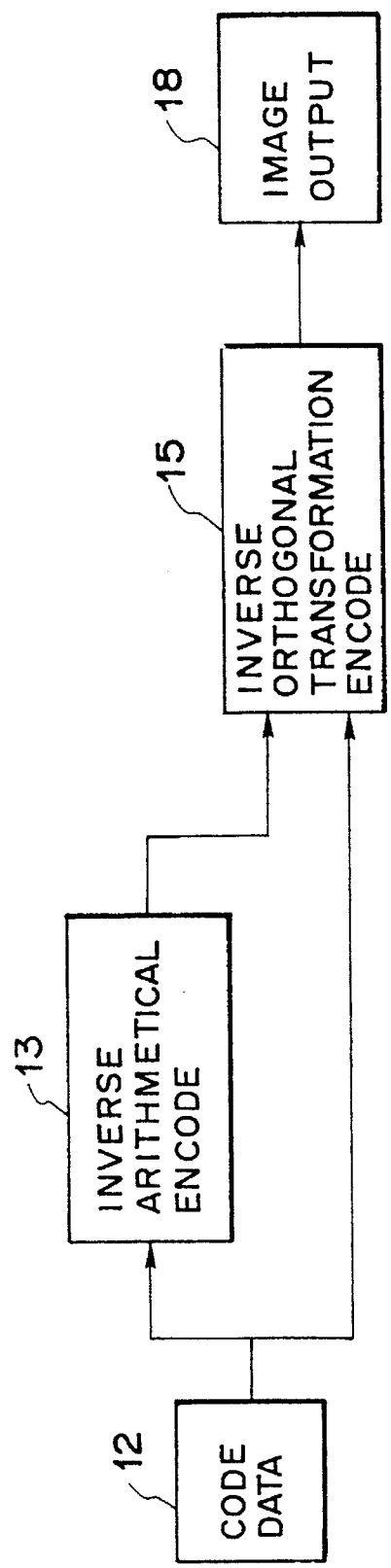

The invention is not also limited to the hybrid type of the reversible encoding and the non-reversible encoding as mentioned above but can be also applied to an ordinary encoding apparatus by only the DCT. In such a case, the apparatus is constructed as shown in FIG. 13A or 13B. In FIGS. 13A and 13B, since the component elements which are designated by the reference numerals 1 to 18 are similar to those in FIGS. 1A and 1B, their descriptions are omitted.

Not only the block in the case where all of the pixels in the block are completely white (level 255) but also the block in the case where, for instance, the average value in the block is equal to or higher than a predetermined level (extremely close to white) can be set as a specific color block.

On the contrary, in the case of an image in which an area of black portions is large, the block in which all of the pixels in the block are black (level 0) can be also set to a specific color block. On the other hand, blue, red, green, or the like may be also set to a specific color.

The invention is not limited to the encoding apparatus but can be also applied to an image processing apparatus, particularly, a copying apparatus which executes a color transforming process and a diagram extracting process, a color image editing apparatus, or the like. Particularly, the output unit on the decoding side is not limited to a hard copy apparatus such as a printer or the like but may be also a soft copying apparatus such as a monitor or the like.

According to the invention as mentioned above, an image processing apparatus which can efficiently encode image data can be provided.

The present invention is not limited to the foregoing embodiments but many modifications and variations are possible within the spirit and scope of the appended claims of the invention.

What is claimed is:

1. An image processing apparatus comprising:

input means for inputting image data representing an image;

dividing means for dividing the image data into a plurality of blocks, each of which is composed of a plurality of pixels;

discriminating means for discriminating, for each block, whether that block is of a first block type or of a second block type, a first block type being one in which not all of the pixels are substantially the same predetermined color and a second block type being one in which all of the pixels are substantially the same predetermined color;

encoding means for encoding, by using an orthogonal transformation, the image data in the first type blocks; and outputting means for outputting the image data in the first type blocks encoded by said encoding means, wherein the image data in the second type blocks is not outputted in orthogonally-transformed form.

2. An apparatus according to claim 1, wherein said predetermined color is white.

3. An apparatus according to claim 1, further having second encoding means for encoding data indicative of a position of any block composed of pixels all of said predetermined color.

4. An apparatus according to claim 1, further having extracting means for extracting an edge portion from the input image data.

5. An apparatus according to claim 4, further having third encoding means for entropy encoding said edge portion.

6. An apparatus according to claim 1, further having judging means for judging whether the input image data includes a color character portion.

7. An apparatus according to claim 6, further having means for binary series converting said color character portion.

8. An apparatus according to claim 1, wherein said orthogonal transformation is DCT.

9. An image processing method comprising the steps of:

inputting image data representing an image;

dividing the image data into a plurality of blocks, each of which is composed of a plurality of pixels;

discriminating, for each block whether that block is of a first block type or of a second block type, a first block type being one in which not all of the pixels are substantially the same predetermined color and a second block type being one in which all of the pixels are substantially the same predetermined color;

encoding, by using an orthogonal transformation, the image data in the first type blocks; and outputting the image data in the first type blocks encoded in said encoding step, wherein the image data in the second type blocks is not outputted in orthogonally-transformed form.

10. An image processing apparatus comprising:

input means for inputting image data representing an image;

dividing means for dividing the input image data into a plurality of blocks, each of which is composed of a plurality of pixels;

discriminating means for discriminating a white block from said blocks;

encoding means for encoding the image data in the blocks other than said white block which has been discriminated by said discriminating means by using an orthogonal transformation method; and outputting means for outputting the image data encoded by said encoding means, wherein the image data in said white block is not outputted in orthogonally-transformed form.

11. An apparatus according to claim 10, wherein said dividing means divides the input image data into N×N (N is a natural number) blocks.

12. An apparatus according to claim 10, further having second encoding means for encoding data indicative of a position of said white block.

13. An apparatus according to claim 10, further having extracting means for extracting an edge portion from input image data.

14. An apparatus according to claim 13, further having third encoding means for entropy encoding said edge portion.

15. An apparatus according to claim 10, further having judging means for judging whether the input image data includes a color character portion.

16. An apparatus according to claim 15, further having means for binary series converting said color character portion.

17. An apparatus according to claim 10, wherein said orthogonal transformation is a DCT.

18. An image processing method comprising the steps of:

inputting image data representing an image;

dividing the image data into a plurality of blocks, each of which is composed of a plurality of pixels;

discriminating a white block from said blocks;

encoding the image data in the blocks other than said white block which has been discriminated by using an orthogonal transformation method; and outputting the image data encoded in said encoding step, wherein the image data in said white block is not outputted in orthogonally-transformed form.

19. An image processing apparatus comprising:

input means for inputting image data as pixels, wherein the image data is grouped in blocks each composed of a plurality of pixels, each pixel represented by a plurality of color components;

first discriminating means for discriminating a chromatic color of a pixel in a block of the input image data;

second discriminating means for discriminating image data where all pixels of a block are of another color; and encoding means for encoding the input image data in accordance with a discriminating result of said first and second discriminating means.

20. An apparatus according to claim 19, wherein said input means is an image reader comprising a CCD sensor.

21. An apparatus according to claim 19, wherein said second discriminating means discriminates white image data in the block.

22. An apparatus according to claim 19, further having extracting means for extracting an edge portion from input image data.

23. An apparatus according to claim 22, wherein said encoding means performs an entropy encoding on the basis of the discrimination result by said first discriminating means and the extraction result by said extracting means.

24. An apparatus according to claim 19, wherein said encoding means performs an encoding using an orthogonal transformation on the basis of the discriminating result by said second discriminating means.

25. An image processing method comprising:

an inputting step of inputting image data as pixels, wherein the image data is grouped in blocks each composed of a plurality of pixels, each pixel represented by a plurality of color components;

first discriminating step of discriminating a chromatic color of a pixel in a block of the input image data;

second discriminating step of discriminating image data where all pixels of a block are of another color; and encoding step of encoding the input image data in accordance with a discrimination result of said first and second discriminating steps.

* * * * *

UNITED STATES PATENT AND TRADEMARK OFFICE
CERTIFICATE OF CORRECTION

PATENT NO. : 5,588,069

DATED : December 24, 1996

INVENTORS : Katayama et al.

It is certified that error appears in the above-identified patent and that said Letters Patent is hereby corrected as shown below:

COLUMN 1:

Line 18, "the" should be deleted; and
Line 21, "3,162,923." should read --5,162,923.--.

COLUMN 4:

Line 10, "dencoded" should read --decoded--; and
Line 12, "dencoded" should read --decoded--.

COLUMN 5:

Line 20, "when $(r,g>th_2)$ and $(b<th_1)$ and $(|r-g|<th_3) (7)$" should read --when $(r,g>th_2)$ and $(b<th_1)$ and $(|r-g|<th_3)$ (7)--.

COLUMN 8:

Line 30, "dencoded" should read --decoded--;
Line 41, "dencoded" should read --decoded--;
Line 46, "dencoded" should read --decoded--;
Line 51, "dencoded" should read --decoded--; and
Line 58, "dencoded" should read --decoded--.

UNITED STATES PATENT AND TRADEMARK OFFICE
CERTIFICATE OF CORRECTION

PATENT NO. : 5,588,069

DATED : December 24, 1996

INVENTORS : Katayama et al.

It is certified that error appears in the above-identified patent and that said Letters Patent is hereby corrected as shown below:

COLUMN 9:

Line 30, "dencoded" should read --decoded--.

Signed and Sealed this

Twentieth Day of May, 1997

*Attest:*

BRUCE LEHMAN

*Attesting Officer*    Commissioner of Patents and Trademarks